US008631954B2

(12) United States Patent
Graux et al.

(10) Patent No.: US 8,631,954 B2
(45) Date of Patent: Jan. 21, 2014

(54) STOPPER FOR A CONTAINER NECK AND A MOLDING MACHINE FOR MOLDING A PLASTICS MATERIAL FOR THE PURPOSE OF FABRICATING SUCH A STOPPER

(75) Inventors: Stephane Graux, Liergues (FR); Veronique Bernard, Anse (FR); Michel Luzzato, Ecully (FR)

(73) Assignee: Tetra Laval Holdings & Finance S.A., Pully (CH)

( * ) Notice: Subject to any disclaimer, the term of this patent is extended or adjusted under 35 U.S.C. 154(b) by 379 days.

(21) Appl. No.: 12/999,256

(22) PCT Filed: Jul. 9, 2009

(86) PCT No.: PCT/FR2009/051360
§ 371 (c)(1),
(2), (4) Date: Dec. 15, 2010

(87) PCT Pub. No.: WO2010/004213
PCT Pub. Date: Jan. 14, 2010

(65) Prior Publication Data
US 2011/0100950 A1    May 5, 2011

(30) Foreign Application Priority Data

Jul. 11, 2008  (FR) ...................................... 08 54766

(51) Int. Cl.
*B65D 53/00*    (2006.01)
(52) U.S. Cl.
USPC ......................................... 215/344; 215/307
(58) Field of Classification Search
USPC ............ 215/344, 307, DIG. 1; 264/268, 318; 425/133.1, 330, 577, 809, DIG. 58
See application file for complete search history.

(56) References Cited

U.S. PATENT DOCUMENTS

| 3,555,606 | A | * | 1/1971 | Hedgewick | 425/556 |
| 4,806,301 | A | * | 2/1989 | Conti | 264/334 |
| 6,021,912 | A | | 2/2000 | Hertrampf | |
| 6,355,201 | B1 | * | 3/2002 | McNary et al. | 264/318 |
| 7,314,146 | B2 | * | 1/2008 | Mavin | 215/307 |

(Continued)

FOREIGN PATENT DOCUMENTS

| DE | 19613830 A1 | 5/1997 |
| EP | 1657177 A | 5/2006 |
| EP | 1666370 A | 6/2006 |

*Primary Examiner* — J. Gregory Pickett
*Assistant Examiner* — Ernesto Grano
(74) *Attorney, Agent, or Firm* — Finnegan, Henderson, Farabow, Garrett & Dunner, LLP

(57) ABSTRACT

The stopper (1) has a tubular skirt (12) for fastening it around the container neck, an end wall (10) perpendicular to the central axis (X-X) of the skirt, and an annular sealing lip (16) extending into the skirt from the inner face (10A) of the end wall. A protrusion (22) connects the inner face of the end wall to the inner face (16B) of a peripheral portion of the lip in order to transmit a movement of the end wall to the lip in the event of excess pressure in the container. In order to release this excess pressure reliably and in a manner which is easy to carry out, the protrusion occupies all the space delimited jointly by the inner face of the end wall, by the inner face of said lip portion and by a geometric plane (P) which passes through said lip portion and intersects the inner face of the end wall along a straight line (L) orthoradial to the axis of the skirt.

10 Claims, 3 Drawing Sheets

(56) References Cited

U.S. PATENT DOCUMENTS 7,900,788 B2 * 3/2011 Gaillot et al. ............. 215/260
8,066,133 B2 * 11/2011 Takamatsu et al. ......... 215/344
2006/0255002 A1 11/2006 Takamatsu et al.
2008/0093328 A1 * 4/2008 Gaillot et al. ............. 215/307

* cited by examiner

STOPPER FOR A CONTAINER NECK AND A MOLDING MACHINE FOR MOLDING A PLASTICS MATERIAL FOR THE PURPOSE OF FABRICATING SUCH A STOPPER

The present invention relates to a stopper for a container neck, and to a plastics molding machine for fabricating such a stopper.

The invention relates more particularly to a stopper that, when its outer skirt is fastened to a container neck, in particular by screw-fastening, closes off the neck in leaktight manner while also enabling any excess pressure prevailing inside the container to be vented automatically. Such stoppers are genuinely advantageous if they are used for stopping containers that contain liquids that can ferment when they are kept for too long, under improper conditions, and/or if they are contaminated after the container is opened for the first time by a consumer who drinks directly from the neck of the container, for example. Such liquids are, for example, milk, fruit juice, white coffee solutions, tea-based solutions, etc. The risks of such containers or of such stoppers breaking suddenly under the effect of such excess pressure, and the risks of the user being sprayed with liquid, or indeed being injured by the stopper on opening the container, are thus avoided.

To this end, EP-A-1 666 370, U.S. Pat. No. 6,021,912 and EP-A-1 657 177 propose respective stoppers each having an annular sealing lip that extends inside its outer skirt while projecting from the inside face of an end wall of the stopper, and that bears in leaktight manner inside a container neck when said neck is closed by the stopper. When the pressure prevailing inside the container exceeds a predetermined threshold value, said sealing lip is locally moved away from the container neck so as to break the leaktight contact between the lip and the neck, under the action of one or more fine ribs that connect points of the inside periphery of the lip to the inside face of the end wall, and that run along said inside face in a direction that is radial relative to the central axis of the lip. The one or more radial ribs make it possible to transmit locally to the sealing lip a fraction of the outwardly bulging or "doming" movement to which the end wall is subjected, relative to its outer skirt that is connected in stationary manner to the container neck, which bulging results from the excess pressure in the container. Conversely, the presence of such rib(s) raises genuine fabrication and utilization problems, which could also explain why stoppers in accordance with the teaching of the two above-mentioned documents are absent from the market. Because of the geometrical shape of each rib, each side edge of the rib is connected to the end wall of the stopper by an angle zone having a 90° angle. Those angle zones are not only difficult to mold, requiring a costly and complex molding machine, but also difficult to unmold, and difficult to clean after unmolding, thereby making it significantly more difficult to sterilize the stopper before it is put in place on the container neck. In addition, in use, the mechanical behavior of the rib(s) is unsatisfactory. Firstly, due to the fineness of such a rib, i.e. to its small dimension in a direction peripheral to the central axis of the stopper, the end of each rib that is connected to the sealing lip tends to bend a little when the stopper is put into place around a container neck, so that in the event of subsequent excess pressure inside the container, the beginning of bulging of the end wall or "ceiling wall" does not serve to entrain the sealing lip locally, but rather to correct the bending of the rib. Secondly, in the absence of excess pressure inside the container, the sealing characteristics procured by the lip present sudden discontinuity at the periphery of the or of each rib, thereby limiting the overall sealing performance procured by the stopper.

An object of the present invention is to provide a stopper in which the function of removing excess pressure is achieved both reliably and easily.

To this end, the invention provides a stopper for a container neck as defined in claim 1.

The basic idea of the invention is to flatten out the angle of the 90° or acute-angled zones between the projecting piece in relief and both the inside face of the end wall and the inside face of the sealing skirt. To achieve this, the invention seeks to shape this projecting piece in relief in the manner of a bevel, thereby greatly facilitating molding of the stopper, unmolding thereof, and sterilization thereof. These advantages certainly outweigh the extra material necessary for occupying the entire space defined between the end wall, the sealing lip, and said bevel. In addition, the presence of this extra material limits the risks of deformation, in particular of the projecting piece in relief bending while the stopper is being put into place around the container neck, so that, when said piece in relief is stressed in the event of excess pressure inside the container, its behavior is reliable, allowing said excess pressure to be vented as soon as the pressure prevailing inside the container reaches a precise predetermined value. In addition, given the geometrical definition of the projecting piece in relief of the invention, the intersection between the plane defining the piece in relief and the inside face of the sealing lip forms a curved line that extends over a peripheral portion of the skirt that is non-negligible, and, in any event, that is significantly greater than the peripheral portion associated with a fine rib of the same type as the ribs proposed in EP-A-1 666 370, U.S. Pat. No. 6,021,912, and EP-A-1 657 177. In this way, the characteristics relative to the sealing procured by the seal present good uniformity all the way around the periphery of the lip, without any sudden discontinuity at the projecting piece in relief.

Advantageous characteristics of the stopper of the invention, taken in isolation or in any technically feasible combination, are specified in dependent claims 2 to 8.

The invention also provides a machine for molding a plastics material for the purpose of fabricating a stopper for a container neck, which machine is as defined in claim 9.

The machine of the invention makes it possible to fabricate a stopper as defined above. In practice, the bevel of the machine of the invention is made by machining, in particular, by grinding, the end of an inner core of a pre-existing molding machine. It can thus be understood that the machine of the invention offers the advantage of being practical and inexpensive.

An advantageous characteristic of the molding machine of the invention is specified in claim 10.

The invention can be better understood on reading the following description given merely by way of example and with reference to the accompanying drawings, in which.

Figure 1:
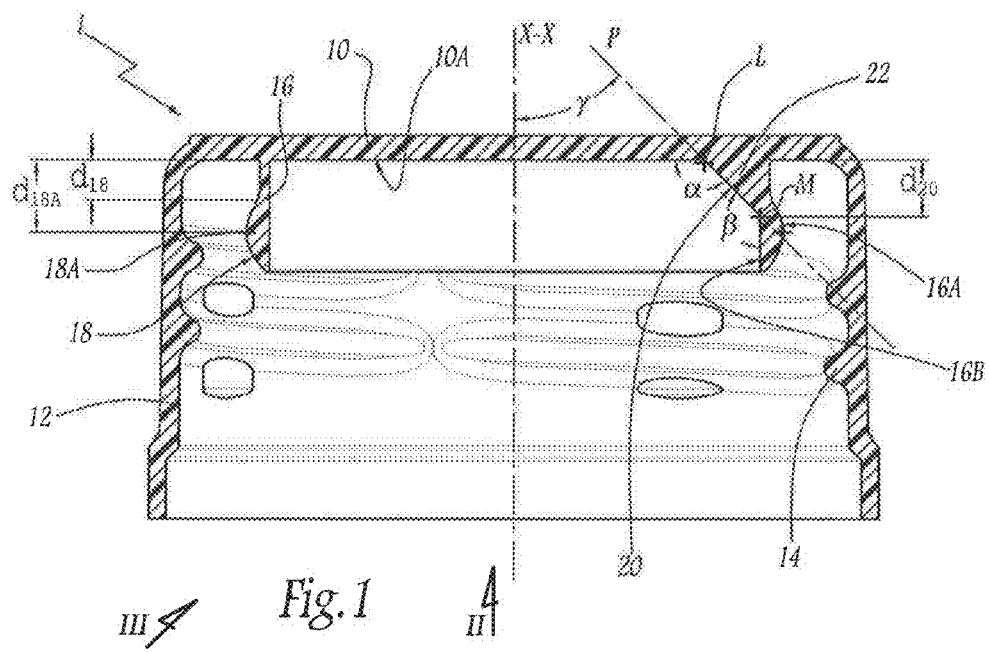
FIG. 1 is a longitudinal section view of a stopper of the invention.
Figure 2:
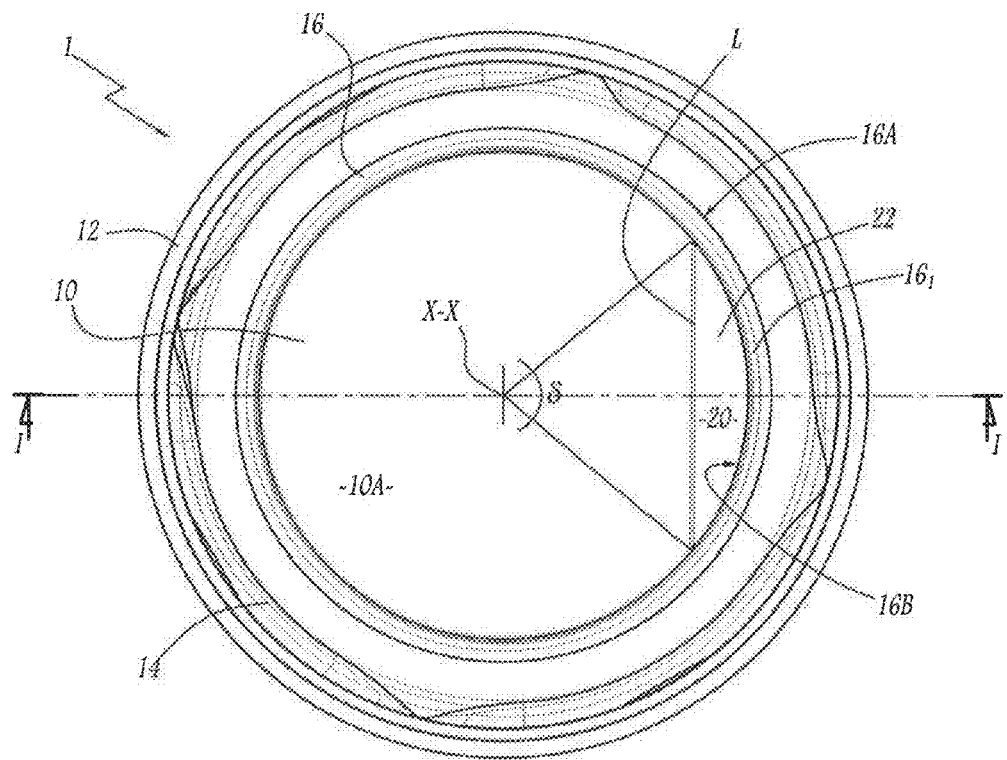
FIG. 2 is a view seen looking along arrow II of FIG. 1, the section plan of FIG. 1 being indicated by line I-I in FIG. 2.
Figure 3:
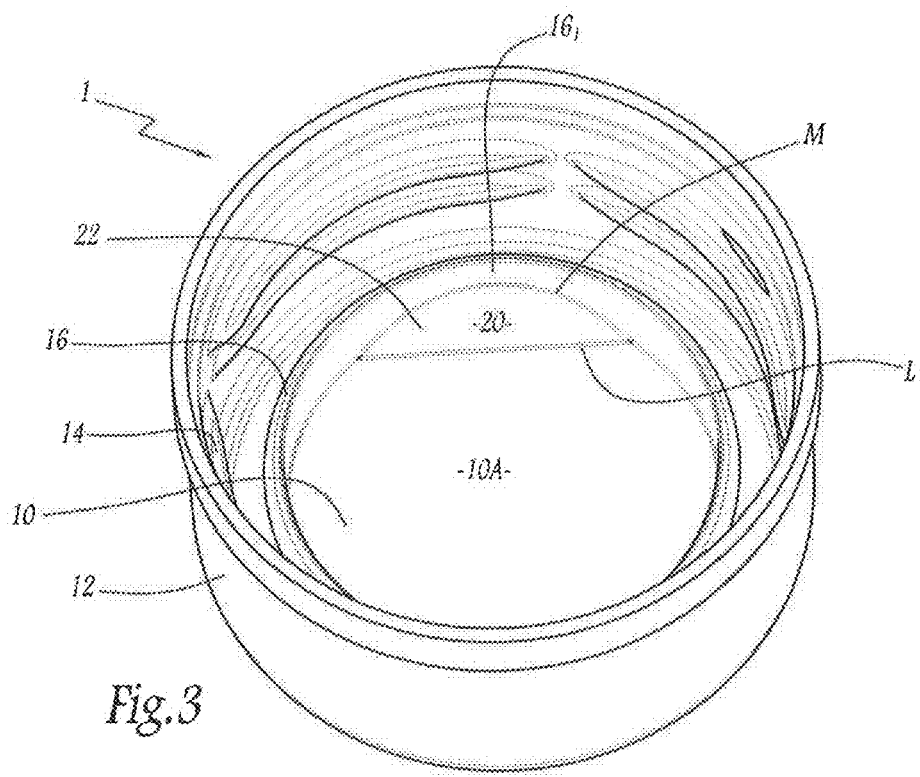
FIG. 3 is a perspective view of the stopper, seen looking in a direction corresponding substantially to arrow III of FIG. 1.
Figure 4:
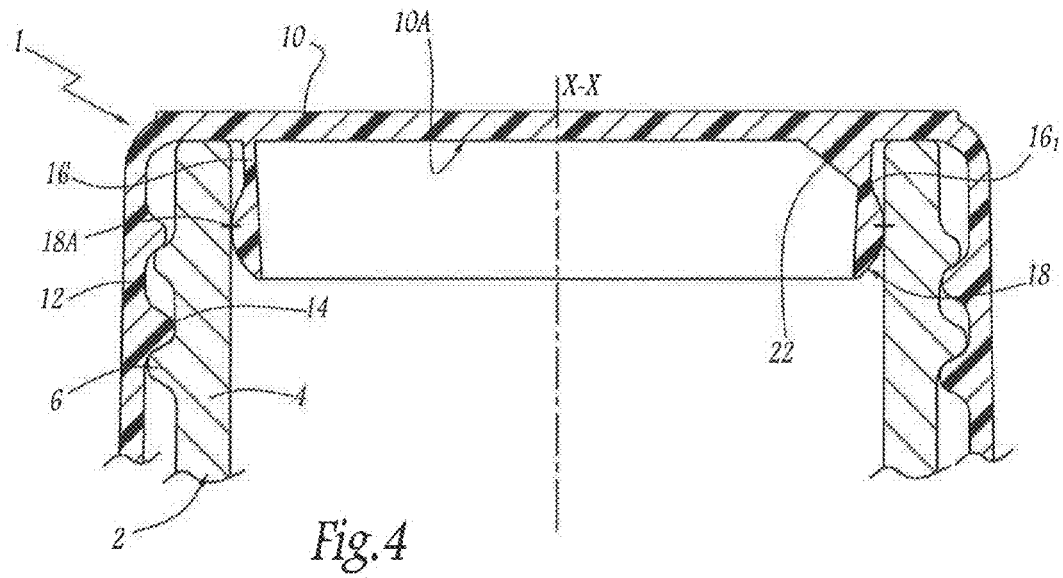
FIGS. 4 and 5 are views analogous to FIG. 1, showing the stopper as assembled to a neck of a container, respectively in the absence of and in the presence of excess pressure inside the container.
Figure 5:
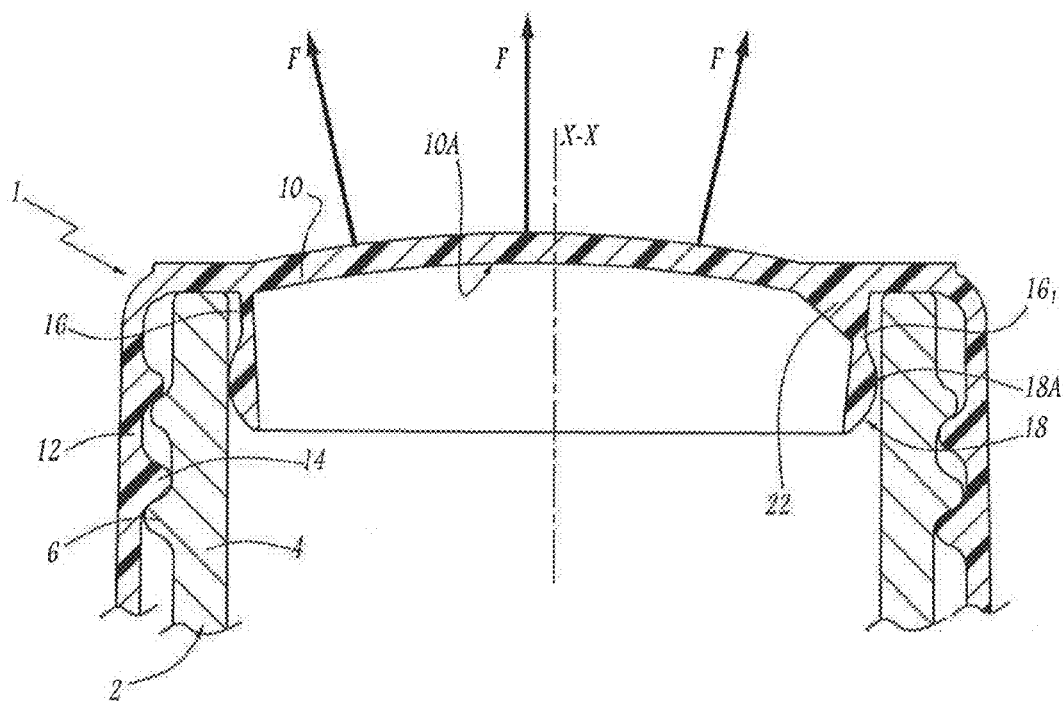

FIGS. 1 to 3 show a stopper 1 that, as shown in FIGS. 4 and 5, is adapted to be fastened to a neck 2 of a container. In practice, either the neck 2 is formed integrally with the remainder of the container, in particular when said container is bottle made of glass or of a plastics material, or else said neck is adapted to be secured permanently to a wall of the container, at an opening passing through said wall.

The stopper 1 and the neck 2 have respective shapes that are substantially tubular with central longitudinal axes substantially that coincide under the reference X-X, when the stopper is fastened to the neck. It is considered herein that the term "inside" indicates a zone of the stopper or of the neck that faces towards the axis X-X, in a direction that is substantially radial thereto, while the term "outside" indicates a zone of the stopper or of the neck that faces substantially in the opposite direction.

The neck 2 comprises a body 4 that is substantially cylindrical, of circular base and of axis X-X. On the outside face of the body, the neck has a projecting thread 6.

The stopper 1 is open at its axial end that faces towards the container, while it is closed at its opposite end by an end wall 10 that is substantially disk-shaped and that is centered on the axis X-X. A tubular skirt 12 that is centered on the axis X-X extends axially towards the container, from the outside periphery of the end wall 10. Said skirt 12 is provided, on its inside face, with a projecting thread 14 that is complementary to the thread 6, in a manner such as to enable the skirt 12 to be screwed and unscrewed around the outside face of the body 4.

The stopper 1 also has an annular lip 16, also centered on the axis X-X and that might be said to be a "bulbous lip". This lip 16 extends axially towards the container from the end wall 10, inside the outer skirt 12. When the stopper is screwed onto the neck 2 as shown in FIGS. 4 and 5, the end wall 10 extends across the neck, while the skirt 12 surrounds the body 4 externally, and, except in the event of excess pressure, as explained below, the lip 16 is, over its entire outside periphery, pressed in leaktight manner against the inside face of said body 4. To this end, at its axial end that is further from the end wall 10, the lip 16 is provided with an outwardly projecting bulb that, over the entire periphery of the outside face 16A of the lip, has a convex surface 18. Said convex surface 18 includes a crest line 18A that extends over the entire outside periphery of the lip 16, while being situated radially further away from the axis X-X than the remainder of the surface 18. When the stopper 1 is fastened to the neck 2, said crest line 18A forms a sealing line by being in contact against the inside face of the body 4.

The inside face 16B of the lip 16 that, in this example, is cylindrical, of circular base and centered on the axis X-X, is connected to the inside face 10A of the end wall 10, i.e. to the plane face of said end wall that faces towards the inside of the skirt 12 and that is perpendicular to the axis X-X, via an angle zone having a right angle, over the entire inside periphery of the lip, except in a peripheral portion 16₁ of the lip 16, as can be seen clearly in FIGS. 2 and 3. At the periphery of this portion 16₁, the above-mentioned angle zone is flattened out by a bevel, i.e. by a plane surface 20 lying in a plane P (FIG. 1) that is inclined relative to the axis X-X and that both passes through the lip portion 16₁ and also intersects the face 10A along a straight line L forming a chord of a circle centered on the axis X-X. The entire space defined jointly by the plane P, by the face 10A, and by the face 16B at the lip portion 16₁ is occupied by the material of the stopper 1 and thus forms a piece in relief 22 that projects towards the inside of the stopper, and that interconnects the end wall 10 and the inside face of the lip portion 16₁. In other words, when the stopper 1 is observed from the inside, as in FIGS. 2 and 3, this projecting piece in relief 22 has a single visible face, namely the plane surface 20 that is connected exclusively firstly to the face 10A along the line L, via an obtuse-angled zone α (FIG. 1), and secondly to the face 16B along a curved line M via an obtuse-angled zone β (FIG. 1).

In the event of excess pressure inside the container while its neck 2 is closed by the stopper 1, i.e. when the pressure inside said container exceeds a predetermined threshold value, said excess pressure causes the end wall 10 to bulge out or "to dome", as indicated by arrows F in FIG. 5, while the skirt 12 remains stationary since it is fastened to the body 4 of the neck 2. This bulging movement is transmitted from the end wall 10 to the lip portion 16₁ via the projecting piece in relief 22, so that said lip portion is moved radially inwards, until the leaktight contact between the surface 18 and the inside face of the body 4 is broken, as can be seen clearly in the right portion of FIG. 5. The sealing procured by the line 18A is then broken at the periphery of the lip portion 16₁, thereby making it possible for the excess pressure to be removed to the outside of the neck 2. By way of example, the above-mentioned threshold pressure value lies in the range 2 bars to 8 bars for commonly commercially available containers containing liquid food that can ferment.

By way of practical embodiments, advantageous examples of dimensioning relating to the piece in relief 22 are specified below, it being understood that these dimensioning examples may be considered in isolation or in partial or total combination:

in particular in order to guarantee good transmission of movement from the end wall 10 to the lip portion 16₁, the angle γ formed, in a longitudinal section plane of the stopper 1 that is perpendicular to the line L, between the plane P and the axis X-X, lies in the range 30° to 60°, and is preferably equal to 45°±5°, as shown in FIG. 1;

in order to avoid sudden discontinuity in the behavior of the lip 16 as regards the sealing relative to the neck 2, the lip portion 16₁ extends through an angle δ centered on the axis X-X that can be defined more precisely as being the angular sector defined by the two points of contact between the straight line L and the curved line M, and that has a value greater than 30°, and preferably equal to 80°±5°, as shown in FIG. 2;

in particular in order to make the behavior of the piece in relief 22 more reliable so that said piece in relief causes the sealing line 18A to break by entraining the lip portion 16₁ at the sealing surface 18 thereof, the maximum axial dimension $d_{20}$ of the surface 20, which dimension corresponds to the maximum axial distance between the face 10A and the line M, is greater than the axial distance $d_{18}$ between the face 10A and the end of the surface 18 that faces towards said face 10A, as indicated in FIG. 1; and in particular in order to limit the quantity of material of which the piece in relief 22 is made, without compromising the reliability of said piece in relief, in particular in order to limit the risks of the material shrinking at the periphery of the lip portion 16₁, the above-mentioned distance $d_{20}$ is less than the axial distance $d_{18A}$ between the face 10A and the crest line 18A, as indicated in FIG. 1.

In order to fabricate the stopper 1, a semi-rigid plastics material such as polypropylene or polyethylene is molded. This molding is such that the end wall 10, the skirt 12, the lip 16, and the piece in relief 22 are formed in one piece.

Figure 6:
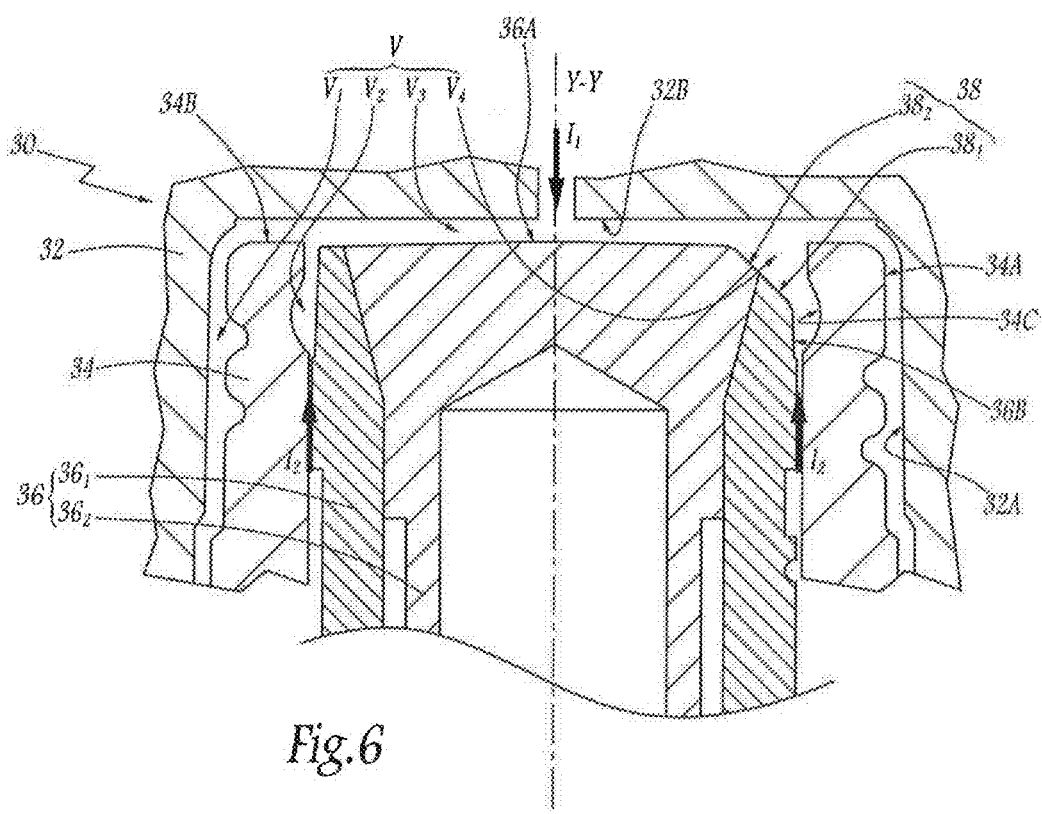
FIG. 6 is a diagrammatic longitudinal section view of a molding machine of the invention.

In practice, by way of example, the molding machine 30 shown in FIG. 6 is used. This machine includes a hollow outer mold 32 having an internal cavity that is cylindrical, of circular base, and centered on a longitudinal axis Y-Y that, at the end of molding of the stopper 1, corresponds to axis X-X. The machine 30 also has two coaxial tubular cores that are disposed one inside the other, namely an outer core 34 and an inner core 36.

In use, the cores 34 and 36 are arranged inside the molding cavity of the mold 32, while being centered on the axis Y-Y, as shown in FIG. 6. In this configuration of use of the machine 30, the mold 32 and the cores 34 and 36 define between them a volume V for receiving a plastics material, which material is injected into the volume V at one or more zones. In this example, the plastics material is injected both through the region of the mold 32 through which the axis Y-Y passes, as indicated by arrow $I_1$, and also radially between the cores 34 and 36, as indicated by arrows $I_2$. The faces of the mold 32 and of the cores 34 and 36 that define said volume V are shaped to mold the stopper 1. Thus, the inside side face 32A of the mold 32 and the outside side face 34A of the core 34 define between them, in a direction radial to the axis Y-Y, a first sub-volume $V_1$ of the volume V, for molding the skirt 12. The inside axial face 32B of the mold 32 and the axial faces 34B and 36A of the cores 34 and 36 define between them, in the direction along the axis Y-Y, a second sub-volume $V_2$ for molding the end wall 10. The inside side face 34C of the core 34 and the outside side face 36B of the core 36 define radially between them a third sub-volume $V_3$ of the volume V, for molding the lip 16.

For molding the piece in relief 22, the volume V also includes a fourth sub-volume $V_4$ occupying the entire space defined between the sub-volume $V_2$ and not including that sub-volume, a peripheral portion of the sub-volume $V_3$ and not including that portion, and a bevel 38 interconnecting the axial face 36A and the outside side face 36B of the inner core 36. Said bevel 38 lies in a plane corresponding to the plane P at the end of molding of the stopper 1 by the machine 30. In other words, this plane intersects the axial face 36A along a straight line forming a chord of a circle centered on the axis Y-Y, and intersects the outside side face 36B along a curved line that intersects the above-mentioned straight line at two points that, between them and in a direction peripheral to the axis Y-Y, define the portion of the sub-volume $V_3$ at which the sub-volume $V_4$ is situated.

Advantageously, and coaxially inside a main molding body $36_1$, the inner core 36 has an unmolding pusher $36_2$. This pusher $36_2$ is adapted so that, after the plastics material has been injected, said pusher is driven in translation along the axis Y-Y relative to the body $36_1$, thereby making it possible, after the mold 32 has been removed, to unmold the stopper 1 from the core 34 and from the body $36_1$. Under these conditions, the bevel 38 is defined jointly by the body $36_1$ and by the pusher $36_2$, by being made up of two elementary surfaces $38_1$ and $38_2$ belonging respectively to said body and to said pusher.

Various arrangements and variants of the stopper 1 and of the machine 30 are also possible. By way of example:
  other dimensioning than that specified above is possible for the above-mentioned distance $d_{20}$, in particular depending on the specific geometrical shape of the outside zone of the lip 16 that is designed to come to bear in leaktight contact against the container neck; in practice, in view of the geometrical shapes of sealing lips that are encountered most frequently on the market, e.g. bulbous lips, arc-shaped lips, etc., "universal" dimensioning of the distance $d_{20}$ consists in making provision for it to be substantially equal to one half of the axial dimension of the sealing lip 16, i.e. of the axial distance between the inside face 10A of the end wall 10 and the end of the lip that is opposite from said end wall; and/or
  embodiments other than threads 6 and 14 are possible for the releasable fastening between the skirt 12 and the container neck 2.

The invention claimed is:

1. A stopper for a neck of a container, the stopper comprising:
  a substantially tubular skirt centered on a longitudinal axis and adapted to be fastened around the neck;
  an end wall closing off one of the longitudinal ends of the skirt and extending substantially perpendicularly to the axis;
  a substantially annular sealing lip centered on the axis and extending inside the skirt from the inside face of the end wall; and
  a projecting piece in relief that interconnects the inside face of the end wall and the inside face of a peripheral portion of the lip, and that is adapted to transmit to the lip movement of the end wall relative to the skirt, so that said portion of the lip is moved radially towards the axis when the pressure inside the skirt is greater than a predetermined threshold value;
  wherein the projecting piece in relief occupies the entire space defined jointly by the inside face of the end wall, by the inside face of said portion of the lip and by a plane that passes through said lip portion and that intersects the inside face of the end wall along a straight line forming a chord of a circle centered on the axis.

2. A stopper according to claim 1, wherein, in a longitudinal section plane of the skirt perpendicular to said straight line, said plane and the axis form an angle lying in the range 30° to 60°.

3. A stopper according to claim 2, wherein said angle is equal to approximately 45°.

4. A stopper according to claim 1, wherein said portion of the lip extends through more than 30° about the axis.

5. A stopper according to claim 4, wherein said portion of the lip extends through approximately 80° about the axis.

6. A stopper according to claim 1, wherein, over the entire periphery of its outside face, the lip defines a convex surface that is adapted to bear in leak tight manner against the container neck, and wherein the maximum axial distance between the inside face of the end wall and the line of intersection between said plane and the inside face of said portion of the lip is greater than the axial distance between the inside face of the end wall and the end of the convex surface that faces towards the end wall.

7. A stopper according to claim 1, wherein, over the entire periphery of its outside face, the lip defines a convex surface that includes a peripheral crest line situated radially further away from the axis than the reminder of the convex surface, and that is adapted to bear in leak tight manner against the container neck along said crest line, and wherein the maximum axial distance between the inside face of the end wall and the line of intersection between said plane and the inside face of said portion of the lip, is less than the axial distance between the inside face of the end wall and the crest line.

8. A stopper according to claim 1, wherein the maximum axial distance between the inside face of the end wall and the line of intersection between said plane and the inside face of said portion of the lip is equal to about one half of the axial dimension of the lip.

9. A machine for molding a plastics material for fabricating a stopper for a container neck, said machine including a hollow mold, centered on an axis, and two coaxial tubular cores disposed one inside the other and arranged coaxially inside the mold in a manner such as to define a volume for receiving the plastics material, said volume including:

a first sub-volume defined radially between an inside side face of the mold and an outside side face of the outer core, said first sub-volume being adapted to mold a skirt of the stopper, which skirt is substantially tubular, is centered on the axis, and is adapted to be fastened around a container neck;

a second sub-volume defined axially between an inside axial face of the mold and respective axial faces of the outer core and of the inner core, said second sub-volume being adapted to mold an end wall of the stopper that closes off one of the longitudinal ends of the skirt and that extends substantially perpendicularly to the axis;

a third sub-volume defined radially between an inside side face of the outer core and an outside side face of the inner core, said third sub-volume being adapted to mold an annular sealing lip of the stopper, which lip is centered on the axis and extends inside said skirt from the inside face of the end wall; and a fourth sub-volume occupying the entire space defined between the second sub-volume and not including that second sub-volume, a peripheral portion of the third sub-volume and not including that peripheral portion, and a bevel that interconnects the axial face and the outside side face of the inner core, and that lies in a plane that intersects said axial face along a straight line forming a chord of a circle centered on the axis, said fourth sub-volume being adapted to mold a projecting piece in relief of the stopper.

10. A machine according to claim 9, wherein the inner core comprises a main molding body and an unmolding pusher arranged to move along the axis inside the main molding body, the bevel including two surfaces defined respectively by the main molding body and by the pusher.

* * * * *